(No Model.)
M. E. HERTEL & A. BECK.
BICYCLE SUPPORT.
No. 505,162. Patented Sept. 19, 1893.
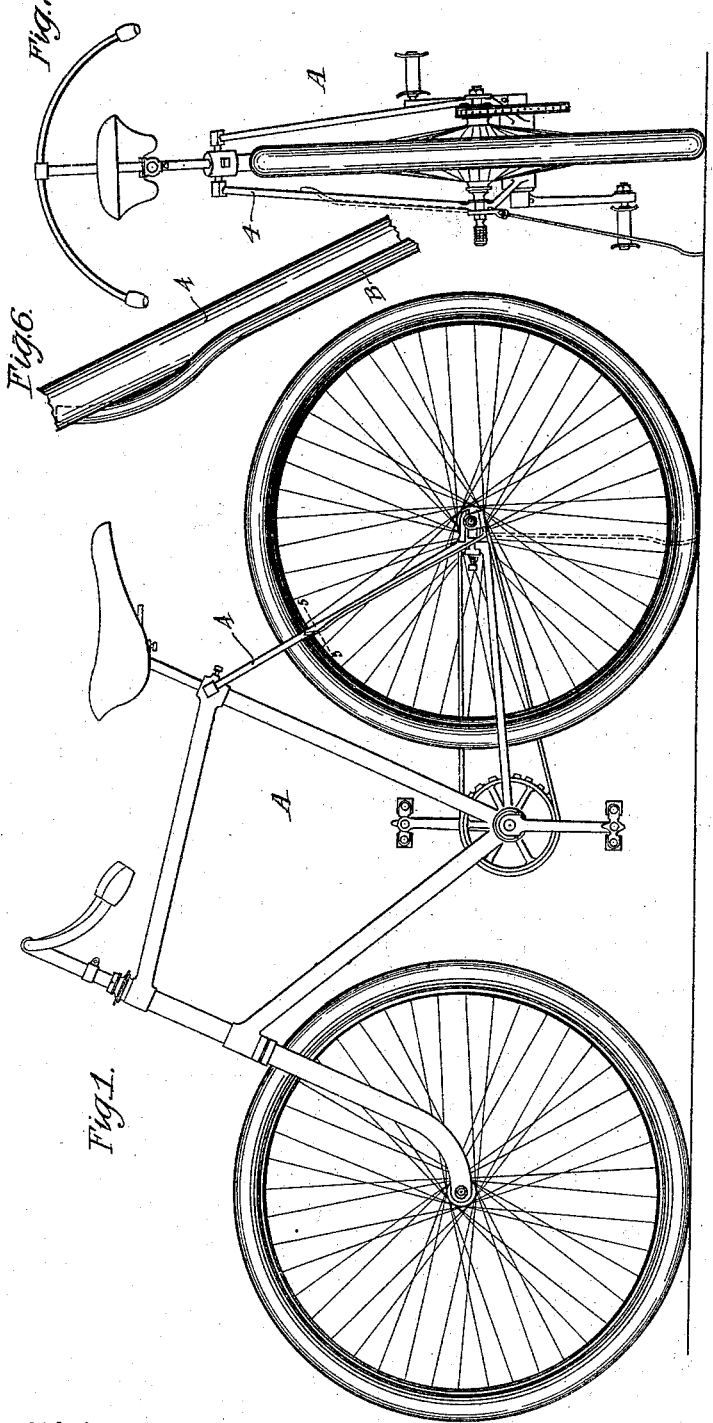
Witnesses:
Arthur C. Lotz
Rudolph W. Lotz
Inventors:
Max Emil Hertel and August Beck
By Lotz & Kennedy
Attorneys

UNITED STATES PATENT OFFICE.

MAX EMIL HERTEL AND AUGUST BECK, OF CHICAGO, ILLINOIS; SAID HERTEL ASSIGNOR TO SAID BECK.

BICYCLE-SUPPORT.

SPECIFICATION forming part of Letters Patent No. 505,162, dated September 19, 1893.

Application filed April 8, 1893. Serial No. 469,628. (No model.)

*To all whom it may concern:*

Be it known that we, MAX EMIL HERTEL and AUGUST BECK, citizens of the United States, residing at Chicago, in the county of Cook and State of Illinois, have invented certain new and useful Improvements in Bicycle-Supports; and we do hereby declare the following to be a full, clear, and exact description of the invention, such as will enable others skilled in the art to which it appertains to make and use the same.

This invention relates to a novel construction in a bicycle support, the object being to provide a bicycle support that will support the bicycle in a rigid manner and will at the same time be small and light, and which, when not in use, will not interfere with a rider, nor be clumsy or unsightly.

The invention consists in the features of construction and the combinations of parts hereinafter fully described and specifically claimed.

In the accompanying drawings illustrating our invention,—Figure 1 is a side elevation of a safety bicycle provided with a support constructed in accordance with our invention. Fig. 2 is a rear end elevation of the same in the position it will assume when supported by the device. Figs. 3 and 4 are detail views of the support. Figs. 5 and 6 are fragmentary detail views.

Referring now to said drawings, A indicates a safety bicycle of ordinary construction.

Our improved bicycle support consists essentially of the bar B. This bar B is bent at one end at about right angles to the length of the bar, as shown at 1, and this bent end 1 is pivoted to a plate 2 that has an opening 3 at its other end portion which slips over the axle of the bicycle. This plate 3 is rigidly secured to the axle of the bicycle by a nut or otherwise, and when so secured the bent end or pivot 1 of the bar is located a little inclined, so that when the bar is swung downwardly on its pivot it will stand about vertical by reason of the fact that the bent end 1 is at a little more than a right angle to the bar B. When the said bar is thrown downwardly on its pivot it will obviously support the bicycle in an upright position by inclining the bicycle slightly, as shown in Fig. 2. with the bar B resting on the ground.

When the support or bar B is not in use it is swung upwardly on its pivot, and we have provided for devices for securing it to one of the brace bars 4 of the bicycle frame. The free end of the bar B is bent spirally so that it has a compound curve, as illustrated in the drawings, and the location of its pivot is so arranged with relation to the brace bar that when the bar is swung upwardly it will lie close to said brace bar, but the extreme end of the spirally bent portion will strike against the outer face of this brace bar. The said bar, however, possesses sufficient elasticity to permit it to be easily pressed to one side, so that the spirally bent end will slip behind the said brace bar 4. We have shown in the drawings the manner in which the supporting bar B is held to the brace bar, and it will be understood that although the force required to bend it around the brace bar, or to disengage it therefrom, is slight, yet it will be firmly held in place under all circumstances.

It will be understood that said bicycle support can be applied to various forms of velocipedes by suitable mechanical changes.

We claim as our invention—

1. The combination with a velocipede, of a supporting bar pivoted thereto, and provided with a bent or deflected end for engaging the frame of the velocipede, substantially as described.

2. The combination with a velocipede, of a braced supporting bar pivoted thereto and provided with a spirally bent or deflected end to engage the frame of the velocipede, substantially as described.

3. The combination with a plate 2 rigidly secured to the axle of a velocipede, of a supporting bar B pivoted to said plate 2 and having a bent or deflected end to engage the frame of the velocipede, substantially as described.

4. The combination with a velocipede having a brace bar 4, of a supporting bar pivoted to said velocipede and having a bent or deflected end located to engage said brace bar, said bent or deflected end of the supporting bar being so arranged that when it is swung toward said brace bar it will engage the outer face of the same, substantially as described.

In testimony whereof we affix our signatures in presence of two witnesses.

MAX EMIL HERTEL.
AUGUST BECK.

Witnesses:
RUDOLPH W. LOTZ,
E. J. BOILEAU.